United States Patent

Pirat

(10) Patent No.: US 9,341,280 B2
(45) Date of Patent: May 17, 2016

(54) DUAL REGULATION LEVEL VALVE AND DE-ICING DEVICE FOR AN AIR INLET OF AN AIRCRAFT ENGINE NACELLE INCORPORATING SAID VALVE

(71) Applicant: Airbus Operations S.A.S., Toulouse (FR)

(72) Inventor: Guillaume Pirat, Tecou (FR)

(73) Assignee: Airbus Operations S.A.S. (FR)

( * ) Notice: Subject to any disclaimer, the term of this patent is extended or adjusted under 35 U.S.C. 154(b) by 350 days.

(21) Appl. No.: 14/096,278

(22) Filed: Dec. 4, 2013

(65) Prior Publication Data

US 2014/0150902 A1    Jun. 5, 2014

(30) Foreign Application Priority Data

Dec. 5, 2012 (FR) .................................. 12 61656

(51) Int. Cl.
*F16K 31/124* (2006.01)
*G05D 16/16* (2006.01)

(52) U.S. Cl.
CPC .......... *F16K 31/1245* (2013.01); *G05D 16/166* (2013.01); *Y10T 137/7761* (2015.04)

(58) Field of Classification Search
CPC . F16K 31/1245; F16K 31/122; G05D 16/166; F02C 9/18; Y10T 137/7761; Y10T 137/7759; Y10T 137/776; Y02T 50/56
USPC ................ 137/487, 486, 487.5, 489.5, 492.5, 137/115.13, 625.49
See application file for complete search history.

(56) References Cited

U.S. PATENT DOCUMENTS

| 3,749,336 A | | 7/1973 | Christensen et al. |
| 3,769,998 A | * | 11/1973 | Avant ..................... F16K 31/365 |
| | | | 137/116.5 |
| 3,862,644 A | * | 1/1975 | Emmons .................. G05D 7/03 |
| | | | 137/486 |
| 4,617,958 A | * | 10/1986 | Seidel .................. G05D 16/163 |
| | | | 137/488 |

(Continued)

FOREIGN PATENT DOCUMENTS

| EP | 2 256 390 A2 | 12/2010 |
| FR | 2813581 A1 | 3/2002 |

(Continued)

OTHER PUBLICATIONS

French Search Report (FR 13 57521) (May 6, 2014).

*Primary Examiner* — Craig Schneider
*Assistant Examiner* — Minh Le
(74) *Attorney, Agent, or Firm* — Lerner, David, Littenberg, Krumholz & Mentlik, LLP

(57) ABSTRACT

A valve for regulating the pressure of a gas flow in a duct according to two pressure levels includes a gate whose position is controlled by an actuator with two chambers and a first control means with a first set point pressure P1 making it possible to position the gate in a first regulated position by comparing a pressure $P_{av}$ downstream of the gate and the first set point pressure P1. The valve further includes a second control means with a second set point pressure P2 making it possible to position the gate in a second regulated position by comparing the pressure $P_{av}$ downstream of the gate and the second set point pressure P2 and permutation means for making the first control means or the second control means communicate alternately with one of the chambers of the actuator.

15 Claims, 4 Drawing Sheets

(56) References Cited

U.S. PATENT DOCUMENTS

| | | | | |
|---|---|---|---|---|
| 4,702,273 | A * | 10/1987 | Allen, Jr. | F02C 7/277 123/179.31 |
| 4,783,026 | A | 11/1988 | Rumford et al. | |
| 4,796,651 | A * | 1/1989 | Ginn | G01F 1/22 137/487 |
| 4,831,819 | A * | 5/1989 | Norris | F02C 7/047 244/134 R |
| 5,047,965 | A * | 9/1991 | Zlokovitz | G05D 16/2093 137/487 |
| 6,443,395 | B1 | 9/2002 | Porte et al. | |
| 7,025,088 | B2 * | 4/2006 | Saunders | F01D 17/08 137/488 |
| 7,066,710 | B2 * | 6/2006 | Wiggins | F16K 31/1635 137/488 |
| 7,147,430 | B2 * | 12/2006 | Wiggins | F01D 17/145 137/488 |
| 7,959,109 | B2 | 6/2011 | Dasilva et al. | |
| 8,210,201 | B2 * | 7/2012 | Fowler | F16K 35/02 137/489.5 |
| 8,286,661 | B2 * | 10/2012 | Krake | F16K 31/1245 137/487 |
| 8,360,097 | B2 * | 1/2013 | Tanner | F16K 1/221 137/492.5 |
| 8,876,054 | B2 * | 11/2014 | Porte | B64D 33/02 244/134 B |
| 9,222,596 | B2 * | 12/2015 | Maljanian | F16K 31/124 |
| 2003/0192595 | A1 * | 10/2003 | Benson | G01F 1/363 137/488 |
| 2005/0242310 | A1 | 11/2005 | Takiguchi et al. | |
| 2010/0001138 | A1 | 1/2010 | Dasilva et al. | |
| 2010/0281880 | A1 | 11/2010 | Porte | |
| 2010/0301238 | A1 | 12/2010 | Krake et al. | |
| 2013/0276892 | A1 * | 10/2013 | Kamp | F04D 27/0253 137/1 |
| 2014/0366964 | A1 * | 12/2014 | Kamp | F16K 31/1245 137/486 |
| 2015/0315975 | A1 * | 11/2015 | Simpson | F16K 31/1225 137/488 |

FOREIGN PATENT DOCUMENTS

| | | |
|---|---|---|
| FR | 2 925 878 A1 | 7/2009 |
| GB | 767 177 A | 1/1957 |
| GB | 1 295 092 A | 11/1972 |

* cited by examiner

DUAL REGULATION LEVEL VALVE AND DE-ICING DEVICE FOR AN AIR INLET OF AN AIRCRAFT ENGINE NACELLE INCORPORATING SAID VALVE

FIELD OF INVENTION

The present invention relates to a dual regulation level valve and to a de-icing device for an air inlet of an aircraft engine nacelle incorporating said valve.

The present invention relates more particularly to the engine nacelles that incorporate a de-icing device of pneumatic type, using hot air taken from the compressor of the motorization which can be injected at the air inlet and more particularly brought into contact with the internal wall of the air inlet.

BACKGROUND OF THE INVENTION

As is known, a propulsive assembly of an aircraft comprises an engine nacelle in which a motorization is arranged substantially concentrically. The engine nacelle comprises, at the front, an air inlet which is extended inside the engine nacelle by a duct for channeling the air towards the motorization.

In certain conditions, frost or ice can tend to form at the air inlet. This formation of frost or ice must be limited in order to avoid having blocks of ice ingested by the motorization and damaging it. To this end, the engine nacelle comprises a de-icing device. Hereinafter in the description, the term "de-icing" covers both treating frost and ice.

According to an embodiment known from the documents FR-2.813.581 and U.S. Pat. No. 6,443,395, illustrated in FIG. 1, an engine nacelle 10 comprises, inside, a partition called front frame 12 which delimits, with the air inlet 14, an annular duct 16 which is also called "D-duct" which extends over the entire circumference of the engine nacelle and which has an approximately D-shaped section.

This duct 16 comprises a hot air supply with at least one orifice 18 and one exhaust 20 for discharging the cooled air used for the de-icing.

The hot air is taken at an outlet 24 of a compressor stage of the motorization 22 and the hot air supply comprises a pipeline 26 for routing it to the orifice 18. This pipeline 26 comprises pressure measuring means 28 and means for regulating the pressure in order to deliver the requisite quantity of hot air at the orifice 18.

A motorization 22 comprises a plurality of outlets 24, 24', 24'', each having a pressure/temperature pairing that is different from the others. The outlet 24 is chosen by establishing a trade-off between the hot air requirements for the de-icing and the structural and thermal capabilities of the air inlet 14. Thus, the air flow taken must have a high pressure and temperature to ensure effective de-icing. Conversely, an excessively high temperature and/or pressure can damage the air inlet which is generally produced from composite materials.

The means for regulating the pressure comprise a first pressure regulation valve 30 and a pressure regulation and stop valve 32.

The pressure regulation valve is controlled by a solenoid and can occupy two positions, a fully open position and a regulated position. This valve 30 is regulated pneumatically with a single pressure level.

The pressure regulation and stop valve 32 is controlled by two solenoids and can occupy three positions, a fully open position, a regulated position and a closed position. This valve 32 is regulated pneumatically with a single pressure level identical to that of the pressure regulation valve 30.

In the absence of any electrical signal, the pressure regulation and stop valve 32 occupies the fully open position whereas the regulation valve occupies the regulated position.

FIG. 2 schematically shows a pressure regulation and stop valve 32. The latter comprises a shutter 34 of butterfly type pivoting in the pipeline 26, which can, by pivoting about a rotation axis 36, occupy three positions, a fully open position (solid line), a regulated position and a closed position (broken lines).

The flow circulating in the pipeline 26 has a pressure $P_{am}$ upstream of the shutter 34 and a pressure $P_{av}$ downstream of the shutter 34.

The position of this shutter 34 is subjected to a rod of a piston 38 of an actuator 40 of pneumatic type which comprises two chambers separated by the piston, a control chamber 42 with a pressure $P_c$ and a head chamber 44 with a pressure $P_t$. When the volume of the control chamber 42 increases, the rod of the piston provokes the rotation of the shutter 34 to the fully open position. When the volume of the control chamber 42 decreases, the rod of the piston provokes the rotation of the shutter 34 towards the closed position.

The control chamber 42 comprises a spring 45 which tends to increase the volume of said chamber 42 and therefore to provoke the full opening of the shutter 34 when $P_c$ and $P_t$ are identical.

A duct 46 extends from a tap arranged upstream of the shutter 34 to the head chamber 44.

A duct 48 extends from a tap arranged upstream of the shutter to the control chamber 42.

Each duct 46, 48 comprises a pressure reducer 46R and 48R.

The duct 48 comprises a first valve 50 which can occupy two states, passing or blocked, controlled by a first solenoid 52. By default, the first valve 50 is in the passing state. In the absence of a signal, the first solenoid 52 is deactivated and the first valve 50 is in the passing state. The shutter 34 can be in the regulated or fully open position depending on the pressure difference between $P_t$ and $P_c$.

On reception of a signal S1, the first solenoid 52 is activated, provoking the change of state of the first valve 50 to the blocked state. In this case, the shutter 34 occupies the closed position since the control chamber is not pressurized.

The duct 48 comprises a coupling with a duct 54 linked to a control means 56 with a set point pressure. This control means 56 makes it possible to compare the downstream pressure $P_{av}$ to a set point pressure and to adjust the pressure $P_c$ as a function of this comparison in order to position the shutter 34 in the regulated position. This control means 56 can be activated or deactivated using a second solenoid 58.

According to one embodiment, the control means 56 comprises a reserve 60 linked to the duct 54 with an exhaust 62 and a so-called pilot actuator 64 comprising a piston 66 whose rod controls the exhaust 62. The pilot 62 comprises two chambers, a first chamber 68 containing a spring 70 and a second chamber 72 linked by a duct 74 to a tap 76 provided downstream of the shutter 34. When the pressure $P_{av}$ exerts on the piston 66 a force less than that exerted by the spring 70, the rod of the piston 66 tends to keep the exhaust 62 in the closed state. On the other hand, when the pressure $P_{av}$ exerts a force greater than that exerted by the spring 70, the rod of the piston 66 opens the exhaust 62 which tends to lower the pressure $P_c$ of the control chamber and to move the shutter 34 towards the closed position.

A balance applies when the pressure $P_{av}$ is equal to the set point pressure and the shutter occupies the regulated position.

To activate or deactivate the control means 56, the duct 74 comprises a second valve 78 which can occupy two states, passing or blocked, controlled by the second solenoid 58. In the absence of a signal, the second solenoid 58 is deactivated and the second valve 78 is in the blocked state. In this case, the control means 56 is deactivated and, if the first solenoid 52 is deactivated, the shutter 34 is in the fully open position.

On reception of a signal S2, the second solenoid is activated and the second valve 78 is in the passing state. In this case, the control means 56 is activated and, if the first solenoid 52 is deactivated, the shutter 34 is in the regulated position.

Thus, according to the embodiment described above, in the absence of a signal S1 and S2, the shutter is in the fully open position. On reception of the signal S1, the shutter is in the closed position. On reception of the signal S2, the shutter is in the regulated position.

According to the prior art, the pressure regulation and stop valve 32 allows a single regulation level with a set point pressure which is a function of the characteristics of the spring 70, of the volume of the reserve 60 and/or of the exhaust 62.

This type of regulation provides the following advantages:
- a simple control logic which depends solely on the reception or non-reception of a signal,
- a regulation control that is simple by virtue of the absence of a servo control loop in the manner of an electrohydraulic servo valve,
- high reliability because of the small number of elements,
- safe operation for ensuring anti-icing efficiency, the shutter 34 being in the fully open position by default.

Even though it comprises many advantages, this type of regulation cannot be fully satisfactory because the regulation can work only according to a single pressure level.

Thus, in certain circumstances, for example for certain motorizations, it is not possible to establish a trade-off for all the flight phases, with a single regulation level, between the de-icing efficiency and the maximum temperature and pressure that can be accepted by the air inlet.

For other hot air requirements of the aircraft, such as, for example, conditioned air for the cabin, the hot air flow taken at the motorization must be regulated more flexibly, according to a number of regulation levels.

To achieve this objective, a first solution consists in using at least two hot air outlets 24, 24' of the motorization, the two outlets being connected alternately as a function of the flight phases and/or of the outside conditions. This solution is not fully satisfactory because it leads to a further increase in the complexity of the architecture in the motorization environment.

A second solution would be to use an exchanger in order to modify at least one of the parameters (pressure/temperature) of the regulated airflow. However, this solution is relatively costly and complex, and results in increasing the embedded weight.

Finally, a third solution would be to use an electrohydraulic servo valve which makes it possible to control a hydraulic pressure (and therefore a degree of opening of the shutter) proportionally as a function of an electrical signal. This solution is not fully satisfactory because it leads to an increase in the complexity of the control logic and the servo control.

SUMMARY

Various aspects of the present invention aim to remedy the drawbacks of the prior art by proposing a regulation valve according to two pressure levels which retains the advantages provided by the pressure regulation and stop valve of the prior art, namely a reliable and safe device, of simple design, with a simple control logic.

To this end, an embodiment of the invention is a valve for regulating the pressure of a gas flow in a pipeline according to two pressure levels, said valve comprising a gate arranged in said pipeline, the position of which is controlled by an actuator with two chambers.

According to an embodiment of the invention, the valve comprises two control means, a first control means with a first set point pressure P1 making it possible to position the gate in a first regulated position by comparing a pressure $P_{av}$ downstream of the gate and the first set point pressure P1, and a second control means with a second set point pressure P2 making it possible to position the gate in a second regulated position by comparing the pressure $P_{av}$ downstream of the gate and the second set point pressure P2, and permutation means for making the first control means or the second control means communicate alternately with one of the chambers of the actuator.

In a particular embodiment, the permutation means comprise a first distributor which can occupy two states, and a first control for positioning the first distributor in one or other of the states, the first distributor comprising, on the one hand, a first inlet and a second inlet, and, on the other hand, a first outlet and a second outlet, the first and second inlets communicating respectively with the first and second outlets in the first state, and the first and second inlets communicating respectively with the second and first outlets in the second state.

Advantageously, the first control comprises a solenoid which can occupy two states, a deactivated state in the absence of a signal corresponding to the second state of the first distributor and an activated state on reception of a signal S1 corresponding to the first state of the first distributor.

More advantageously, the permutation means comprise a return means making it possible to keep the first distributor in the second state, the second control means communicating with the chamber of the actuator for which the volume increase provokes the movement of the gate towards a fully open position.

The pressure regulation valve according to an embodiment of the invention can also have some of the following features, taken individually or in combination:
- the actuator comprises a spring which tends to keep the gate in the fully open position;
- each chamber of the actuator is linked by a duct to a tap provided on the pipeline upstream of the gate.

Advantageously, the first control means comprises a reserve with an exhaust and an actuator comprising a piston whose rod controls the exhaust, the actuator comprising two chambers, a first chamber containing a spring and a second chamber linked by a duct to a tap provided downstream of the gate.

According to a first variant, the second control means comprises a reserve with an exhaust and an actuator comprising a piston whose rod controls the exhaust, the actuator comprising two chambers, a first chamber containing a spring and a second chamber linked by a duct to a tap provided downstream of the gate, said reserve, said exhaust and said actuator being distinct from those of the first control means.

According to a second variant, the second control means comprises a reserve with an exhaust controlled by the actuator of the first control means, said reserve and said exhaust being distinct from those of the first control means.

In a preferred embodiment, the permutation means comprise two outlets and the valve comprises means making it possible to make either the two outlets of the permutation means communicate with the two chambers of the actuator, or a single outlet communicate with one of the two chambers. This preferred embodiment makes it possible to position the gate in a position in which it fully closes the pipeline. Consequently, the regulation valve can then be qualified as pressure regulation and stop valve. Advantageously, this pressure regulation and stop valve is such that the first set point pressure P1 is less than the second set point pressure P2 and the second control means is linked to the chamber of the actuator for which the volume increase provokes the movement of the gate towards a fully open position.

According to one embodiment, the pressure regulation and stop valve comprises a second distributor that can occupy two states, and a second control for positioning the second distributor in one of the two states, the two outlets of the permutation means communicating with the two chambers of the actuator in the first state, a single outlet communicating with one of the two chambers in the second state.

The pressure regulation and stop valve can also have some of the following features, taken individually or in combination:

the second control comprises a solenoid that can occupy two states, a deactivated state in the absence of a signal corresponding to the first state of the second distributor and an activated state on reception of a signal S2 corresponding to the second state of the second distributor;

the valve comprises a return means making it possible to keep the second distributor in the first state.

The invention also relates to a de-icing device for an air inlet of an aircraft engine nacelle comprising a pressure regulation valve or a pressure regulation and stop valve as mentioned previously.

BRIEF DESCRIPTION OF THE DRAWINGS

Other features and advantages will become apparent from the following description of the invention, given purely as an example, in light of the appended drawings in which.

DETAILED DESCRIPTION

Figure 1:
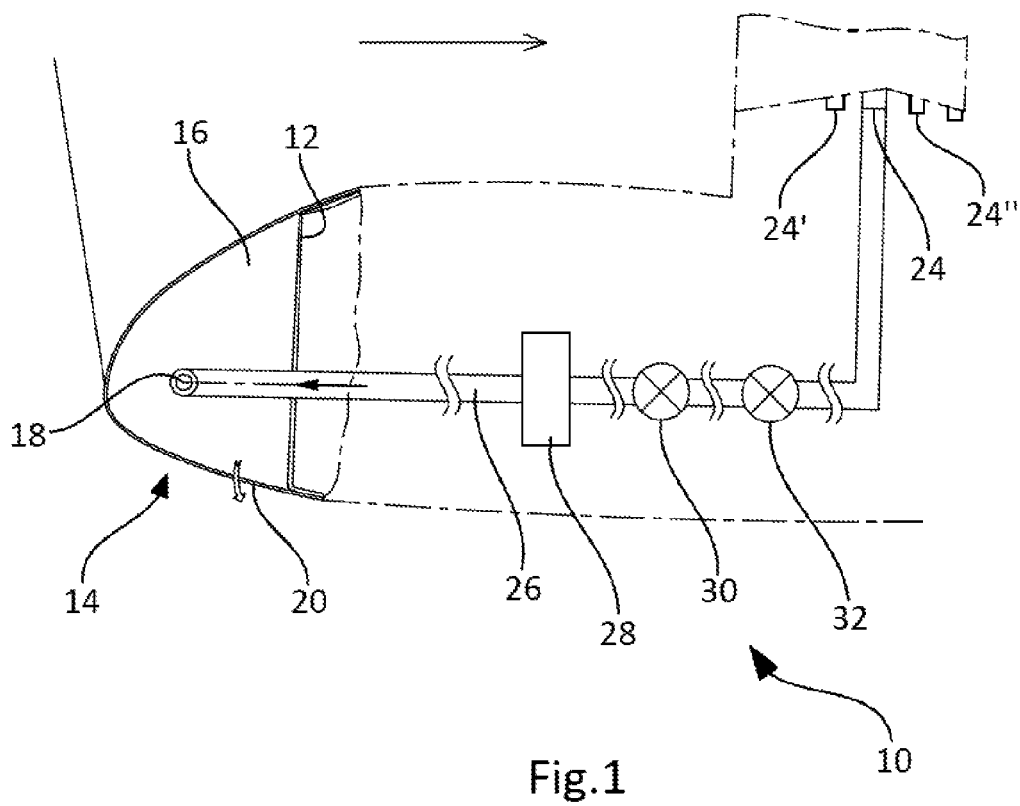
FIG. 1 is a schematic representation of a part of an engine nacelle of an aircraft according to the prior art.
Figure 2:
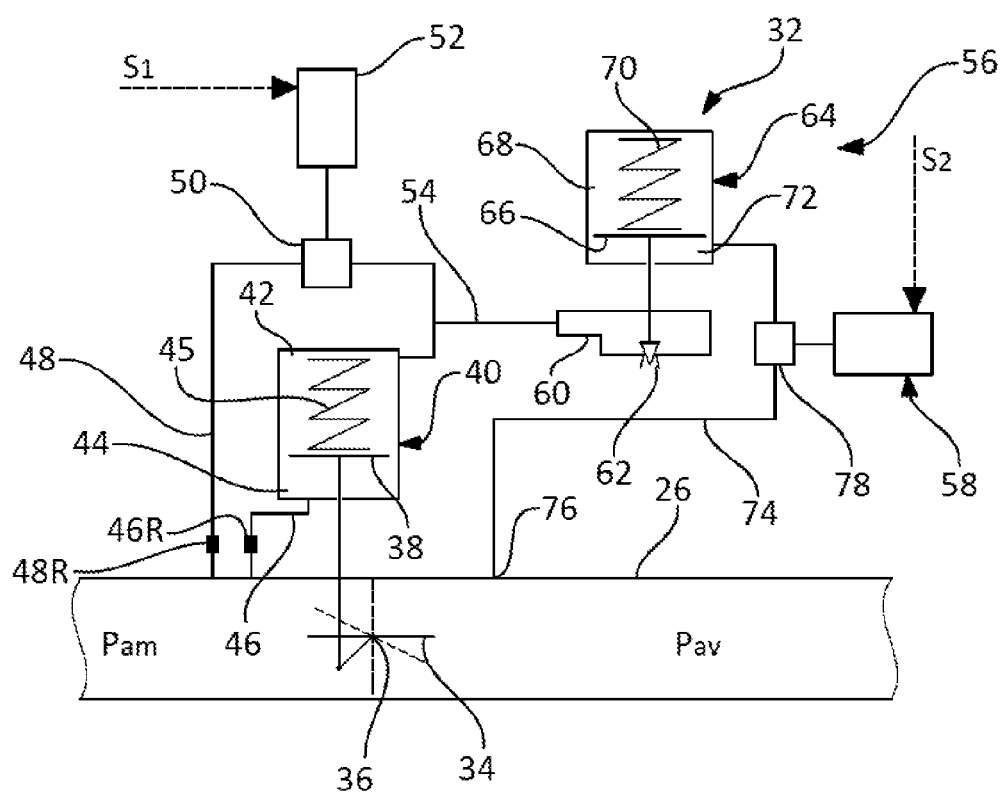
FIG. 2 is a diagram of a pressure regulation and stop valve according to the prior art.
Figure 3:
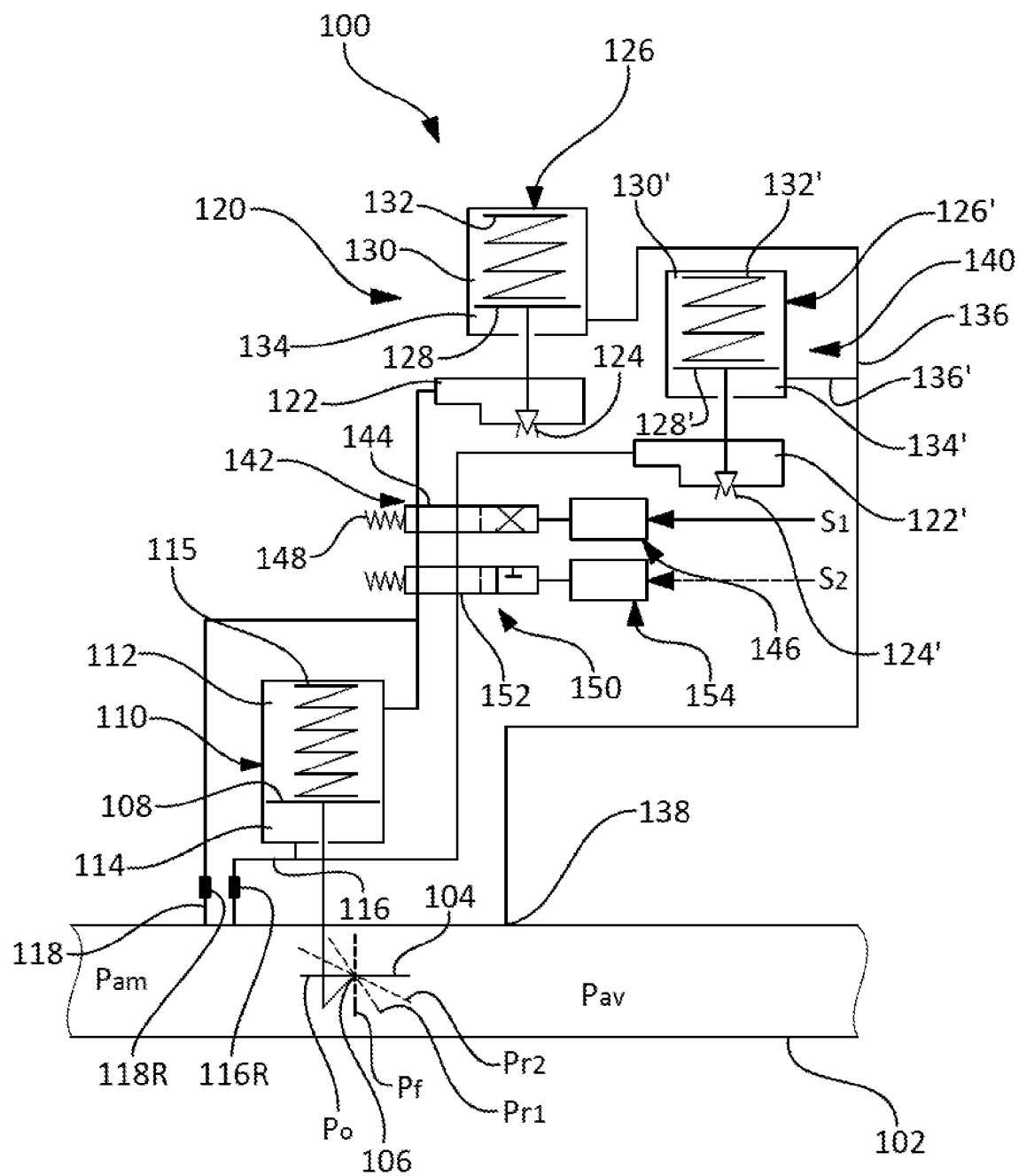
FIG. 3 is a diagram of a pressure regulation and stop valve according to a first embodiment of the invention.
Figure 5:
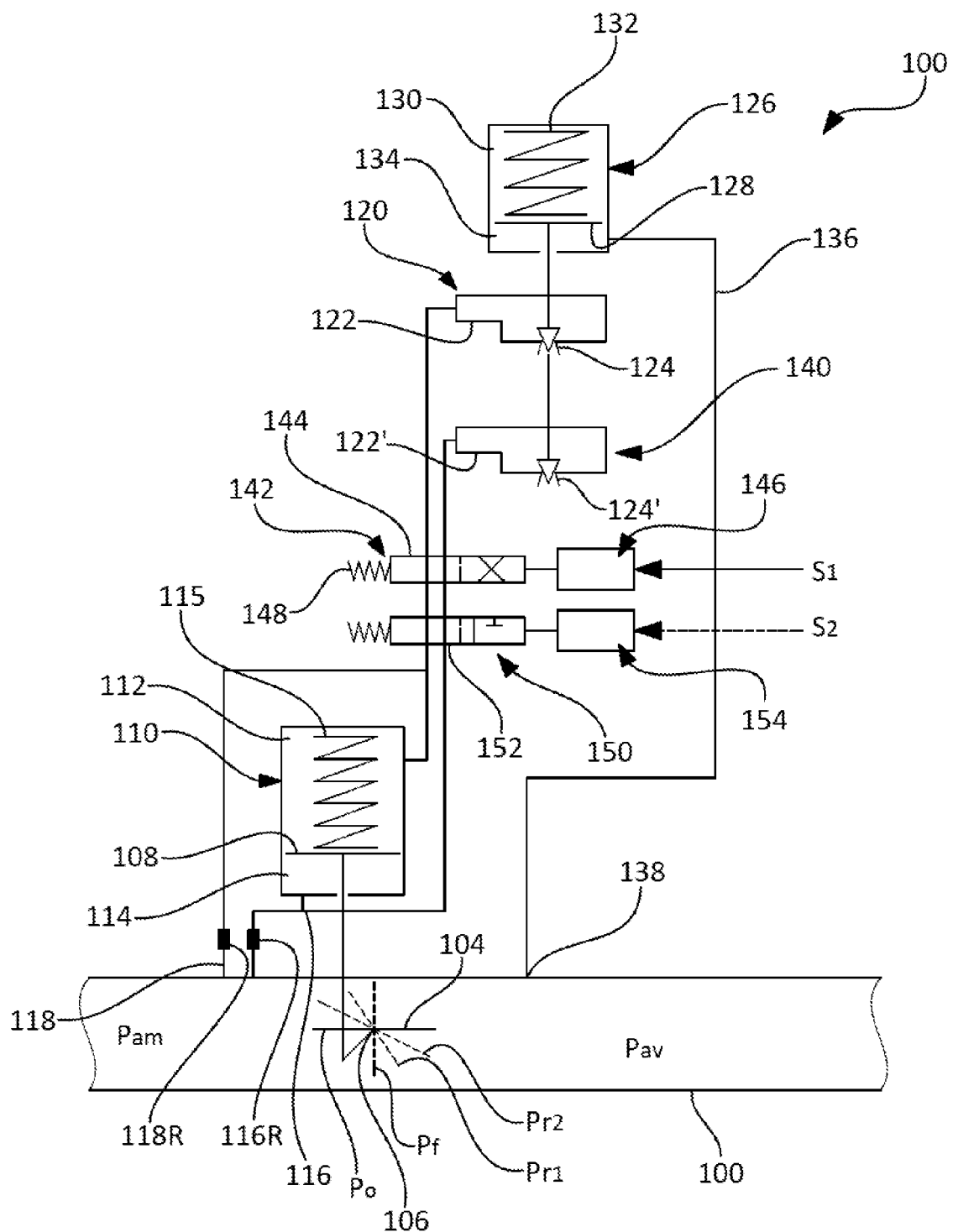
FIG. 5 is a diagram of a pressure regulation and stop valve according to another embodiment of the invention.

FIGS. 3 and 5 show a pressure regulation and stop valve 100 provided in a pipeline 102 for routing a gas flow.

This valve is included in a de-icing device of an air inlet of an aircraft engine nacelle whose other elements can be identical to those of the prior art. Consequently, they are no longer described.

As for the prior art, the valve 100 comprises a gate 104 arranged in the pipeline 102, such as a shutter of butterfly type which can pivot about a rotation axis 106.

The flow circulating in the pipeline 102 has an upstream pressure $P_{am}$ upstream of the gate 104 and a downstream pressure $P_{av}$ downstream of the gate 104.

The gate 104 is subjected to a rod of a piston 108 of an actuator 110 of pneumatic type which comprises two chambers separated by the piston, a control chamber 112 with a pressure $P_c$ and a head chamber 114 with a pressure $P_t$. When the volume of the control chamber 112 increases, the rod of the piston 108 provokes a movement of the gate 104 towards a fully open position. When the volume of the control chamber 112 decreases, the rod of the piston 108 provokes a movement of the gate 104 towards a closed position.

The control chamber 112 comprises a spring 115 which tends to increase the volume of said chamber 112 and consequently keep the gate in the fully open position.

A duct 116 extends from a tap arranged on the pipeline upstream of the gate 104 to the head chamber 114.

A duct 118 extends from a tap arranged on the pipeline upstream of the gate 104 to the control chamber 112.

Each duct 116, 118 comprises a pressure reducer 116R and 118R.

The valve 100 comprises a first control means 120 with a first set point pressure P1 which communicates with one of the two chambers 112, 114, in this case the control chamber 112, in order to modify the position of the gate 104 by comparing the downstream pressure Pav and the first set point pressure P1.

According to one embodiment, the first control means 120 comprises a reserve 122 with an exhaust 124 and an actuator, called pilot 126, comprising a piston 128 whose rod controls the exhaust 124. The pilot 126 comprises two chambers, a first chamber 130 containing a spring 132 and a second chamber 134 linked by a duct 136 to a tap 138 provided downstream of the gate 104. When the pressure $P_{av}$ exerts on the piston 128 a force less than that exerted by the spring 132, the rod of the piston 128 tends to keep the exhaust 124 in the closed state. On the other hand, when the pressure $P_{av}$ exerts a force greater than that exerted by the spring 132, the rod of the piston 128 opens the exhaust 124.

According to the invention, the valve 100 comprises a second control means 140 with a second set point pressure P2. This control means 140 makes it possible to modify the position of the gate 104 by comparing the downstream pressure $P_{av}$ and the second set point pressure P2. In addition, the valve 100 comprises permutation means 142 for making the first control means 120 or the second control means 140 communicate alternately with the control chamber 112 of the actuator 110 used to control the shutter 104.

According to this configuration, it is possible to position the gate in a first regulated position Pr1 when the control chamber is linked to the first control means 120 with a first pressure level P1, and in a second regulated position Pr2 when the control chamber is linked to the second control means 140 with a second pressure level P2.

Preferably, the permutation means 142 comprise a first distributor 144 which can occupy two states, a first state (FIGS. 3, 4A, 4C and 5) in which the first control means 120 communicates with the control chamber 112 and a second state (FIGS. 4B and 4D) in which the second control means 140 communicates with the control chamber 112, and a first control 146 for positioning the first distributor 144 in one or other of the states.

According to one embodiment, the first control 146 takes the form of a solenoid that can occupy two states, a deactivated state in the absence of a signal and an activated signal on reception of a signal S1. When the solenoid is activated, the first distributor 144 is in the first state and the first control means 120 communicates with the control chamber 112.

Preferably, the permutation means 142 comprises a return means 148 such as a draw spring making it possible to keep the first distributor 144 in the second state, the second control means 140 communicating with the control chamber 112.

According to a preferred embodiment, the permutation means 142 can occupy two states, a first state in which the first control means 120 communicates with the control chamber 112 and the second control means 140 communicates with the head chamber 114, and a second state in which the first control means 120 communicates with the head chamber 114 and the second control means 140 communicates with the control chamber 112. The permutation means 142 comprise two inlets, a first inlet En1 linked to the first control means 120 and a second inlet En2 linked to the second control means 140, as well as two outlets, a first outlet So1 and a second outlet So2, the inlets En1 and En2 communicating respectively with the outlets So1 and So2 in the first state, and the inlets En1 and En2 communicating respectively with the outlets So2 and So1 in the second state (see FIG. 4A).

In addition, the valve 100 comprises means 150 making it possible to make either the two outlets of the permutation means 142 communicate with the control chamber 112 and the head chamber 114, or a single outlet communicate with the control chamber 112 or the head chamber 114.

This preferred embodiment makes it possible for the valve 100 to position the gate 104 in four positions, a fully open position $P_o$, a fully closed position $P_f$, a first regulated position $P_{r1}$ (angularly variable as a function of the upstream pressure Pam) with a pressure level P1 and a second regulated position $P_{r2}$ (angularly variable as a function of the upstream pressure Pam) with a pressure level P2.

According to one embodiment, the pressure level P1 of the first control means 120 is less than the pressure level P2 of the second control means 140.

According to one embodiment, the means 150 comprise a second distributor 152 that can occupy two states, a first state in which the outlets So1 and So2 of the permutation means 142 communicate respectively with the control chamber 112 and the head chamber 114, and a second state in which only the outlet So1 of the permutation means 142 communicates with the control chamber 112, as well as a second control 154 for positioning the second distributor 152 either in the first state or in the second state.

According to one embodiment, the second control 154 takes the form of a solenoid that can occupy two states, a deactivated state in the absence of a signal and an activated state on reception of a signal S2. When the solenoid is activated, the second distributor 152 is in the second state and only the outlet So1 of the permutation means 142 communicates with the control chamber 112.

Preferably, a return means 156 such as a compression spring makes it possible to keep the second distributor 152 in the first state.

The principle of operation of the valve is described with respect to FIGS. 4A to 4D.

Figure 4A:
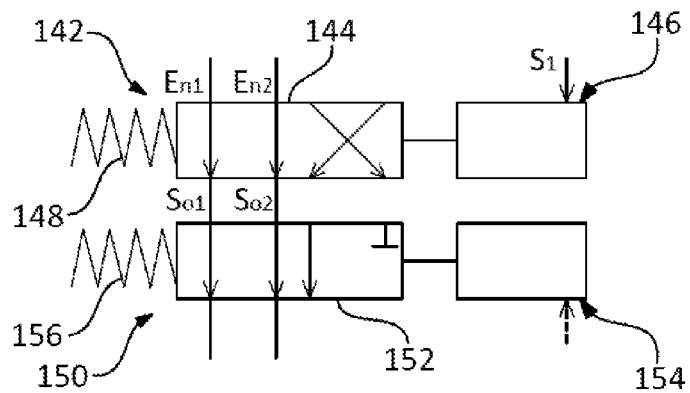
FIGS. 4A to 4D are diagrams illustrating the different states of the distributors corresponding respectively to fully closed, open, regulated according to a first pressure and regulated according to a second pressure positions.
Figure 4B:
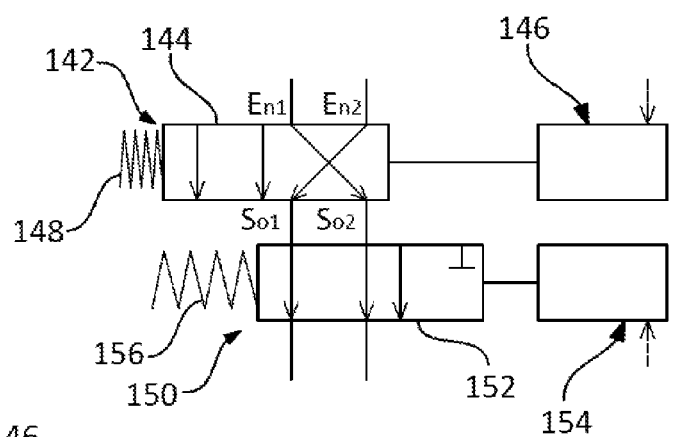

In the absence of a signal S1, S2, the permutation means 142 and the means 150 are respectively in the second state and in the first state, as illustrated in FIG. 4B. In this case, the first control means 120 communicates with the head chamber 114 and the second control means 140 communicates with the control chamber 112. Since the force exerted by the pressure level P1 is well below the forces exerted by the pressure level P2 and the spring 115, the gate 104 tends to open. When the gate 104 is fully open, its fully open state is maintained by an exhaust 124 of the first control means 120 which is larger than the exhaust 124' of the second control means 140 when the two control means 120 and 140 are fully supplied with downstream pressure Pav by the ducts 136 and 136'.

On reception of a signal S1 and in the absence of a signal S2, as illustrated in FIG. 4A, the permutation means 142 and the means 150 are in the first state. In this case, the first control means 120 communicates with the control chamber 112 and the second control means 140 communicates with the head chamber 114. Since the pressure level P1 is much lower than the pressure level P2, the gate 104 tends to close. The closed position is maintained by virtue of the pressure difference obtained by virtue of the reducers 116R and 118R and/or by virtue of an exhaust 124 of the first control means 120 which is larger than the exhaust 124' of the second control means 140 when the two control means are no longer supplied by the ducts 136 and 136', the gate 104 being fully closed and the downstream pressure $P_{av}$ being zero. In order to ensure a good closure dynamic, it is necessary for the sum of the forces exerted by the pressure level P1 and the spring 115 to be lower than the force exerted by the pressure P2.

Figure 4C:
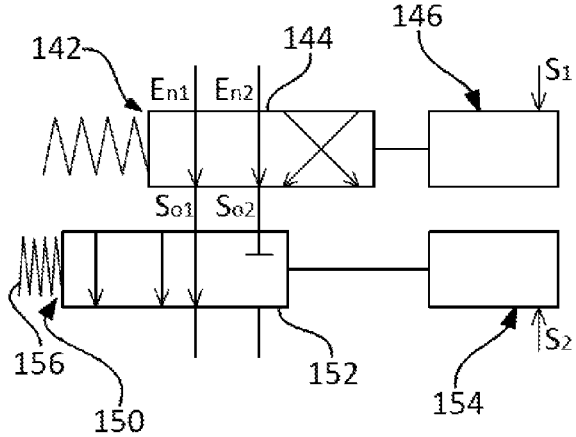
Figure 4D:
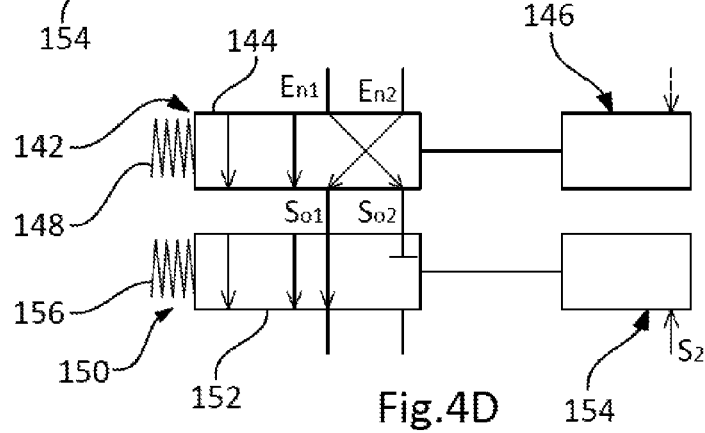

On reception of a signal S2 and in the absence of a signal S1, as illustrated in FIG. 4D, the permutation means 142 and the means 150 are in the second state. In this case, only the second control means 140 communicates with the control chamber 112 and the gate 104 occupies the regulated position $P_{r2}$ according to the second pressure level P2.

On reception of a signal S1 and of a signal S2, as illustrated in FIG. 4C, the permutation means 142 and the means 150 are respectively in the first state and in the second state. In this case, only the first control means 120 communicates with the control chamber 112 and the gate 104 occupies the regulated position $P_{r1}$ according to the first pressure level P1.

Since the pressure level P1 is still well below the pressure level P2, the regulated position $P_{r1}$ corresponds to a control chamber 112 that is little pressurized and therefore to a low regulation level. Thus, $P_{r1}$ corresponds to the low regulation threshold and $P_{r2}$ to the high regulation threshold.

As compared to the prior art, the valve according to an embodiment of the invention provides the following advantages:
- a simple control logic which depends solely on of the reception or non-reception of a signal,
- a regulation control that is simple by virtue of the absence of a servo control loop in the manner of an electrohydraulic servo valve,
- high reliability because of the small number of elements,
- safe operation, the shutter 34 being in the fully open position by default.

In addition to the advantages listed above, the valve according to an embodiment of the invention allows for a regulation dependent on two pressure levels, which makes it possible to obtain a better trade-off between the efficiency of the de-icing function and the maximum temperature and pressure that can be accepted by the air inlet irrespective of flight phases and/or external conditions.

Different solutions can be envisaged for the control means 120 and 140.

According to a first embodiment illustrated in FIG. 3, the control means 120 and 140 are independent and distinct.

As previously described, the first control means 120 comprises a reserve 122 with an exhaust 124 as well as an actuator, called pilot, 126 comprising a piston 128 whose rod controls the exhaust 124. The pilot 126 comprises two chambers, a first chamber 130 containing a spring 132 and a second chamber 134 linked by a duct 136 to a tap 138 provided downstream of the gate 104.

The pressure level P1 depends on the characteristics of the spring 132, of the exhaust 124 and/or of the reserve 122.

In addition, the second control means 140 comprises a reserve 122' with an exhaust 124' as well as an actuator, called pilot, 126' comprising a piston 128' whose rod controls the exhaust 124'. The pilot 126' comprises two chambers, a first chamber 130' containing a spring 132' and a second chamber 134' linked by a duct 136' to a tap provided downstream of the gate 104, and it is possible for this tap to be the same as the tap 138.

The pressure level P2 depends on the characteristics of the spring 132', of the exhaust 124' and/or of the reserve 122'.

According to another embodiment illustrated in FIG. 5, the control means 120 and 140 can have common elements. According to this embodiment, the control means 120 and 140 respectively comprise reserves 122, 122' and exhausts 124, 124' that are distinct. They comprise, in common, a single actuator, called pilot, 126 with a piston 128 whose rod controls the two exhausts 124 and 124', the pilot 126 comprising two chambers, a first chamber 130 containing a spring 132 and a second chamber 134 linked by a duct 136 to a tap 138 provided downstream of the gate 104.

According to this embodiment, the pressure level P1 depends on the characteristics of the exhaust 124 and/or of the reserve 122, and the pressure level P2 depends on the characteristics of the exhaust 124' and/or of the reserve 122'.

The embodiment illustrated in FIG. 5 makes it possible to reduce the number of parts compared to the embodiment illustrated in FIG. 3 and therefore increase the reliability of the pressure regulation and stop valve 100.

The invention claimed is:

1. A valve for regulating the pressure of a gas flow in a pipeline according to first and second pressure levels, said valve comprising:
   a gate arranged in said pipeline, the position of which gate is controlled by an actuator comprising first and second chambers;
   a first control means with a first set point pressure P1 making it possible to position the gate in a first regulated position by comparing a pressure $P_{av}$ downstream of the gate and the first set point pressure P1;
   a second control means with a second set point pressure P2 making it possible to position the gate in a second regulated position by comparing the pressure $P_{av}$ downstream of the gate and the second set point pressure P2; and
   permutation means for making the first control means or the second control means communicate alternately with one of the first and second chambers of the actuator.

2. The pressure regulation valve according to claim 1, wherein the permutation means comprises:
   a first distributor configured to assume first and second states; and
   a first control for positioning the first distributor in one or other of the first and second states, the first distributor comprising a first inlet and a second inlet, and a first outlet and a second outlet, the first and second inlets communicating respectively with the first and second outlets in the first state, and the first and second inlets communicating respectively with the second and first outlets in the second state.

3. The pressure regulation valve according to claim 2, wherein the first control comprises a solenoid configured to assume first and second states, the first state being a deactivated state in the absence of a signal corresponding to the second state of the first distributor and the second state being an activated state on reception of a signal S1 corresponding to the first state of the first distributor.

4. The pressure regulation valve according to claim 2, wherein the permutation means comprises:
   a return means configured to keep the first distributor in the second state;
   a second control means communicating with the chamber of the actuator, for which the volume increase provokes the movement of the gate towards a fully open position.

5. The pressure regulation valve according to claim 1, wherein the actuator comprises a spring configured to keep the gate in the fully open position.

6. The pressure regulation valve according to claim 1, wherein each chamber of the actuator is linked by a duct to a tap provided on the pipeline upstream of the gate.

7. The pressure regulation valve according to claim 1, wherein the first control means comprises:
   a reserve with an exhaust; and
   an actuator comprising a piston whose rod controls the exhaust, the actuator comprising first and second chambers, the first chamber containing a spring and the second chamber linked by a duct to a tap provided downstream of the gate.

8. The pressure regulation valve according to claim 7, wherein the second control means comprises:
   a reserve with an exhaust; and
   an actuator comprising a piston whose rod controls the exhaust, the actuator comprising first and second chambers, the first chamber containing a spring and the second chamber linked by a duct to a tap provided downstream of the gate, said reserve, said exhaust and said actuator being distinct from those of the first control means.

9. The pressure regulation valve according to claim 7, wherein the second control means comprises a reserve with an exhaust controlled by the actuator of the first control means, said reserve and said exhaust being distinct from those of the first control means.

10. A pressure regulation and stop valve comprising:
    a gate arranged in said pipeline, the position of which gate is controlled by an actuator comprising first and second chambers;
    a first control means with a first set point pressure P1 making it possible to position the gate in a first regulated position by comparing a pressure $P_{av}$ downstream of the gate and the first set point pressure P1;
    a second control means with a second set point pressure P2 making it possible to position the gate in a second regulated position by comparing the pressure $P_{av}$ downstream of the gate and the second set point pressure P2; and
    permutation means for making the first control means or the second control means communicate alternately with one of the first and second chambers of the actuator, wherein the permutation means comprises:
    first and second outlets; and
    wherein the valve comprises means configured to make either the first and second outlets of the permutation means communicate with the first and second chambers of the actuator, or one of the first and second outlets communicate with one of the first and second chambers.

11. The pressure regulation and stop valve according to claim 10, wherein the first set point pressure P1 is less than the second set point pressure P2; and
    wherein the second control means is linked to the chamber of the actuator for which the volume increase provokes the movement of the gate towards a fully open position.

12. The pressure regulation and stop valve according to claim 10, further comprising:
    a second distributor configured to assume first and second states; and a second control for positioning the second distributor in one of the first and second states, the first and second outlets of the permutation means communicating with the first and second chambers of the actuator in the first state, and one of the first and second outlets communicating with one of the first and second chambers in the second state.

13. The pressure regulation and stop valve according to claim 12, wherein the second control comprises:
    a solenoid configured to assume first and second states, the first state being a deactivated state in the absence of a signal corresponding to the first state of the second distributor and the second state being an activated state on reception of a signal S2 corresponding to the second state of the second distributor.

14. The pressure regulation and stop valve according to claim 12, further comprises a return means configured to keep the second distributor in the first state.

15. A device for de-icing an air inlet of an aircraft engine nacelle comprising a pressure regulation valve comprising:
    a gate arranged in said pipeline, the position of which gate is controlled by an actuator comprising first and second chambers;
    a first control means with a first set point pressure P1 making it possible to position the gate in a first regulated position by comparing a pressure $P_{av}$ downstream of the gate and the first set point pressure P1;
    a second control means with a second set point pressure P2 making it possible to position the gate in a second regulated position by comparing the pressure $P_{av}$ downstream of the gate and the second set point pressure P2; and
    permutation means for making the first control means or the second control means communicate alternately with one of the first and second chambers of the actuator or a pressure regulation and stop valve comprising:
a gate arranged in said pipeline, the position of which gate is controlled by an actuator comprising first and second chambers;
a first control means with a first set point pressure P1 making it possible to position the gate in a first regulated position by comparing a pressure $P_{av}$ downstream of the gate and the first set point pressure P1;
a second control means with a second set point pressure P2 making it possible to position the gate in a second regulated position by comparing the pressure $P_{av}$ downstream of the gate and the second set point pressure P2; and
permutation means for making the first control means or the second control means communicate alternately with one of the first and second chambers of the actuator;
wherein the permutation means comprises:
first and second outlets; and
wherein the valve comprises means configured to make either the first and second outlets of the permutation means communicate with the first and second chambers of the actuator, or one of the first and second outlets communicate with one of the first and second chambers.

* * * * *